Sept. 25, 1928.

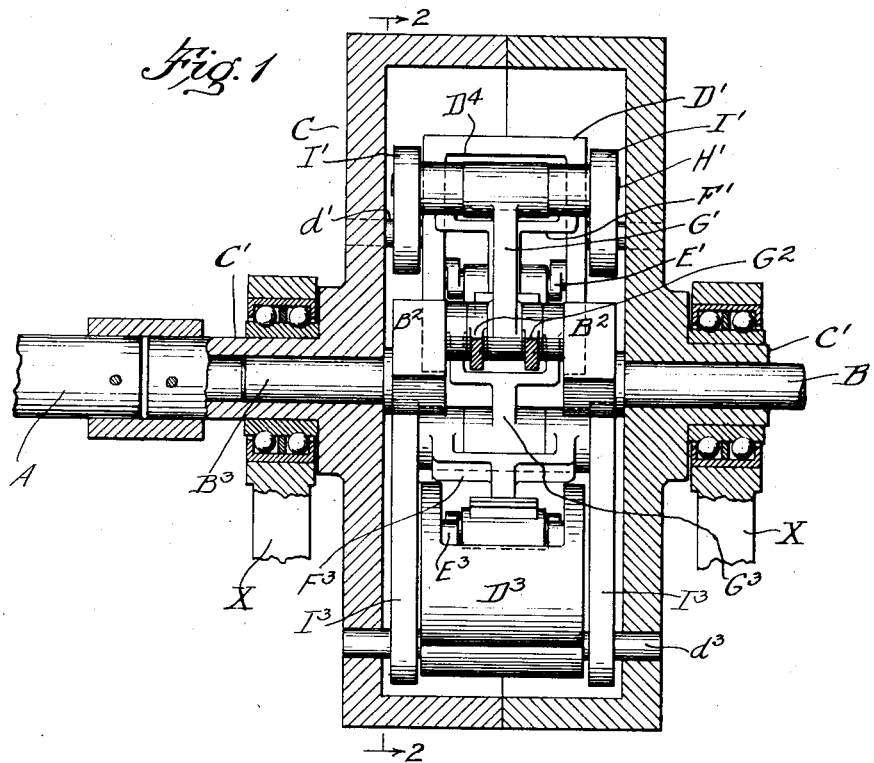
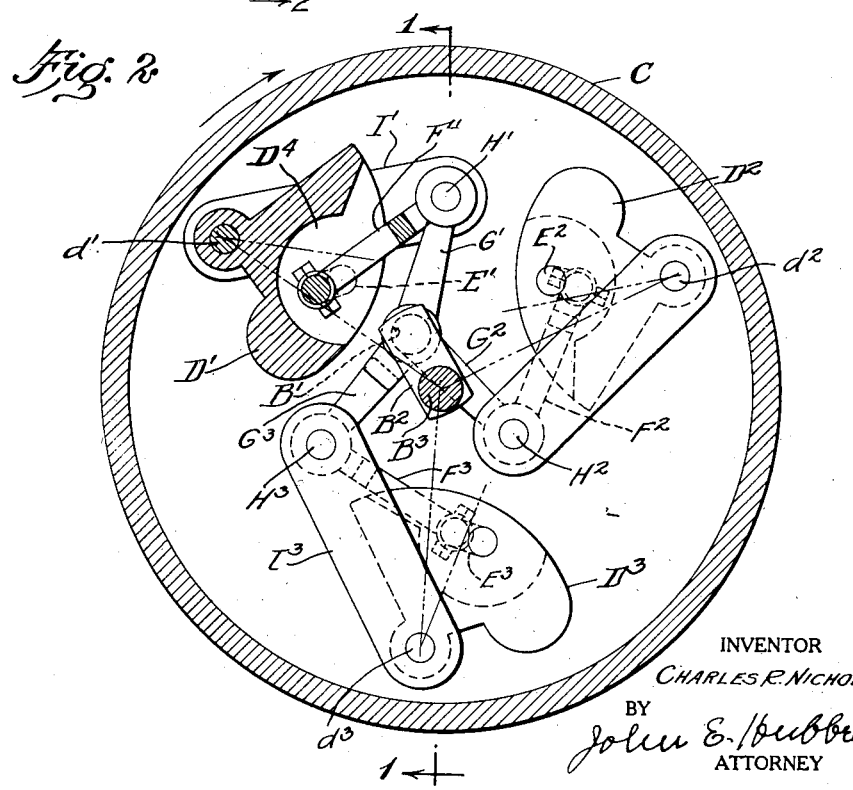

C. R. NICHOLS 1,685,371

POWER TRANSMISSION

Filed Dec. 24, 1926

INVENTOR
CHARLES R. NICHOLS
BY
John E. Hubbell
ATTORNEY

Sept. 25, 1928.
C. R. NICHOLS
1,685,371
POWER TRANSMISSION
Filed Dec. 24, 1926
3 Sheets-Sheet 3
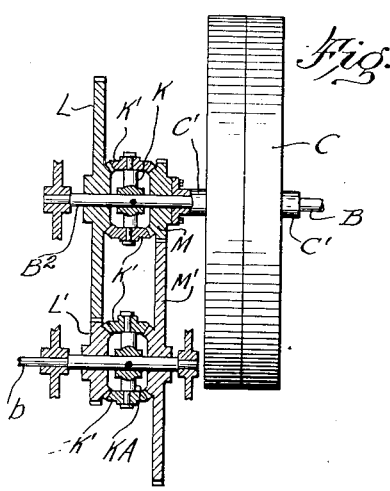
Fig. 8
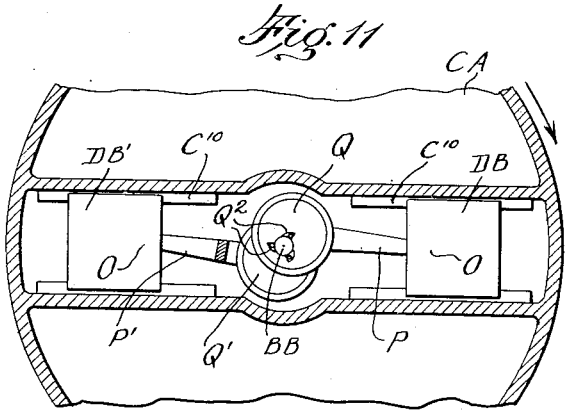
Fig. 11
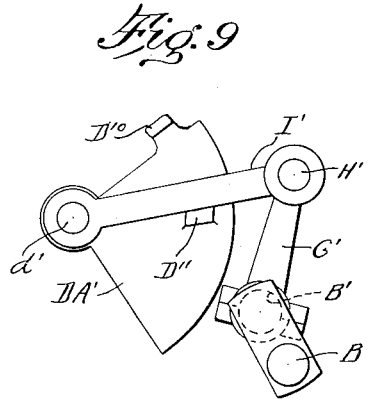
Fig. 9
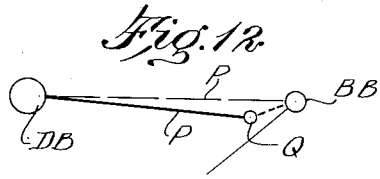
Fig. 12
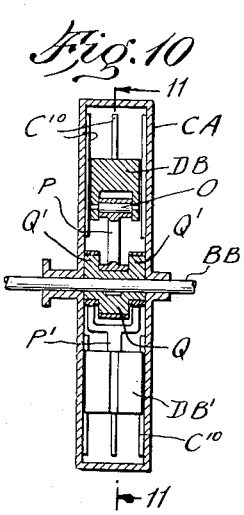
Fig. 10
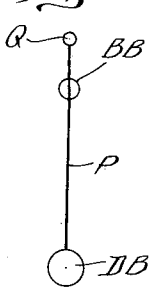
Fig. 13
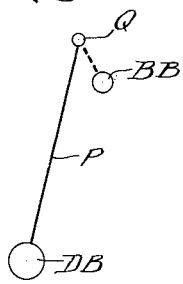
Fig. 14
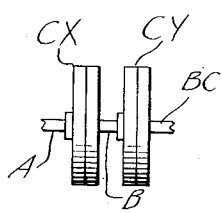
Fig. 16
Fig. 15
INVENTOR
CHARLES R. NICHOLS
BY
John E. Hubbell
ATTORNEY Patented Sept. 25, 1928.

1,685,371

UNITED STATES PATENT OFFICE.

CHARLES R. NICHOLS, OF NEW YORK, N. Y.

POWER TRANSMISSION.

Application filed December 24, 1926. Serial No. 156,800.

The present invention relates to variable speed ratio power transmissions of the type comprising a pair of revoluble members rotating at different relative speeds in automatic correspondence with variations in the difference between the torque impressed on the driving element of the transmission and the retarding torque of the load on the driven element of the transmission. The general object of the invention is to provide simple and effective means for utilizing the centrifugal force effect of a weight connected to, and sharing the general rotative movement of one of said members in impressing torques on said members tending to rotate one and to retard the rotation of the other of said members, so as to thereby vary the relative speeds of said members on changes in the load as required to compensate for the changes in the relation between the driving torque impressed on the driving member and the retarding torque of the load on the driven member which result from said load changes.

A more specific object of the invention is to provide connections between the above mentioned weight and said member which it rotates, whereby the relative rotative movements of said members causes said weight to be moved toward and away from the axis of rotation of the member having the same general rotative movement as the weight, and comprising means for automatically so adjusting the effective length of one of said connections, as said members assume different relative positions, that the torques impressed upon the two members as a result of the centrifugal force effect of the weight, is each continuously, or mainly, in the same direction.

In a preferred construction, the weight through which the centrifugal force effect is obtained, is pivotally connected to the member whose general rotative movement it shares, and the connection between the weight and the other member includes a crank and a linkage of automatically adjustable length through which relative movements of the two members cause the weight to oscillate about its pivotal support, so that the weight periodically passes through a neutral position in which its center of gravity is directly between the axis of rotation of the weight carrying member and the axis of the pivotal connection between the latter and the weight at approximately the instant at which the crank passes through a dead center position. In this arrangement the effective length of the connection between the weight and the crank is changed by the automatic adjustment of said linkage so that with the weight at either side of its neutral position its torque producing effect on the crank is for most of the time, at least, in the same direction. In this arrangement the said linkage alternately subjects the crank to a tension force and to a compression force, and the adjustable provisions may comprise a lost motion device operating to change the effective length of the connection when the force transmitted to said crank changes from a tension force to a compression force.

The above mentioned lost motion device may be constructed in various ways. In a preferred construction it includes a crank shaft journalled in the weight, and a link or connecting rod connected to the crank portion of said crank shaft. In a preferred construction, also, the linkage connection to said weight is arranged and disposed to exert a useful centrifugal force effect, effective during the period in which the lost motion device is functioning to transmit force between the two members and hence tending to make the force transmitted more continuous and uniform.

In an alternative construction the main centrifugal force effect weight moves relative to the member having the same general rotative movement, back and forth between end positions at different distances from the axis of rotation of the last mentioned member, and the automatic provisions for adjusting the effective length of the connection comprise a pawl and ratchet mechanism by which the crank carried by the other member is automatically adjusted approximately 180° about the axis of rotation of the last mentioned member on each movement of the crank through one of its dead center positions. With this arrangement, the force transmitted to said crank is a tension force acting on the crank in the same direction continuously, or practically so, except for the brief intervals in which the pawl and ratchet mechanism is being adjusted.

In practice, to increase the capacity of transmission as well as to obtain smoother and more continuous operation and better balance, each transmission ordinarily comprises a plurality of centrifugal force effect weights. In addition to the more general priniciples referred to above, the invention is characterized by various novel features of construction and arrangement all of which are set forth in the claims annexed to and forming a part of this specification. For a better understanding of the invention, however, its advantages and specific objects attained with its use, reference should be had to the accompanying drawings and descriptive matter in which I have illustrated and described preferred embodiments.

Of the drawings:

Fig. 1 is an elevation with parts broken away and on the line 1—1 of Fig. 2;

Fig. 2 is a section on the line 2—2 of Fig. 1, but with some of the parts broken away and in section back of the line 2—2.

Fig. 8 is an elevation partly in section illustrating a modified construction;

Fig. 9 is an elevation of a portion of another modification;

Fig. 10 is an elevation in section of a third modification;

Fig. 11 is a partial section on the line 11—11 of Fig. 10;

Figs. 12, 13, 14 and 15 are diagrams illustrating the action of the apparatus shown in Figs. 10 and 11; and Fig. 16 is an elevation representing another form of the invention.

Figure 3:
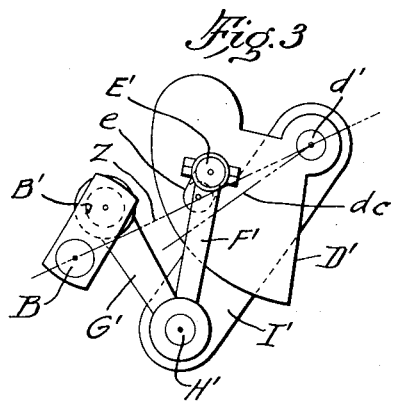
Fig. 3 is a diagrammatic view illustrating one relative position of parts shown in Figs. 1 and 2.

In Figs. 1 and 2 I have illustrated means constructed in accordance with the present invention for transmitting power from a driving shaft A to a driven shaft B. The power transmitting connection between the driving and driven shafts shown in Figs. 1 and 2 comprises a rotatable chambered member C having trunnion-like portions $C'$ journalled in suitable bearing supports X. The shaft A is co-axial with the trunnions $C'$ and is secured to one of the latter. The shaft B is a crank shaft comprising a crank, or crank pin portion $B'$ laterally displaced from the body of the shaft B, and crank arm portions $B^2$ connecting the ends of the crank pin portion $B'$, one to the body of the shaft B, and the other to a shaft portion $B^3$ co-axial with the body of the shaft B. The crank portion of the shaft B is movably received in the chamber space in the member C and the latter is formed with bearings co-axial with, and formed partly within its trunnion portions $C'$, for the body of the driven shaft B, and for the co-axial shaft extension $B^3$.

Mounted in the casing C are a plurality of oscillating weights. As shown there are three of these weights $D'$, $D^2$, and $D^3$. The weight $D'$ is pivotally supported by a corresponding shaft $d'$ having its ends journalled in the member C at the opposite sides of the chamber in the latter. The weight $D'$ is connected to the crank pin portion $B'$ of the driven shaft B by a corresponding connecting rod $G'$, a shaft $H'$ having its ends mounted in links or distance pieces $I'$, each pivotally connected at one end to the shaft $H'$, and at the other end to the shaft $d'$, a connecting rod $F'$ journalled at one end on the shaft $H'$ and journalled at its other end on the crank pin portion of a crank shaft $E'$ the ends or body of which are journalled in the weight $D'$. The latter is cut away as indicated at $D^4$ to provide space in which the crank shaft $E'$ and the adjacent end of the connecting rod $F'$ may work.

The weights $D^2$ and $D^3$ are each similar to the weights $D'$, and are similarly connected to the member C by supporting shafts $d^2$ and $d^3$ respectively. The weights $D^2$ and $D^3$ are also connected to the crank pin portion $B'$ of the driven shaft in the same manner as is the weight $D'$, the connecting parts $E^2$, $F^2$, $G^2$, $H^2$ and $I^2$ associated with the weight $D^2$, and the parts $E^3$, $F^3$, $G^3$, $H^3$ and $I^3$ associated with the weight $D^3$ corresponding respectively with the parts $E'$, $F'$, $G'$, $H'$ and $I'$ associated with the weight $D'$. As shown the only difference in form of these parts is that the driving shaft end of the connecting rod $G^2$ is bifurcated to straddle the corresponding end of the connecting rod $G'$, and the corresponding end of the connecting rod $G^3$ is bifurcated to straddle both the rods $G^2$ and $G'$. Normally, and as shown, the weight supporting shafts $d'$, $d^2$ and $d^3$ are symmetrically disposed about the common axis of the shafts A and B and the member C.

With the driving shaft A rotating in the clockwise direction as seen in Figs. 2 to 7, and with the driven shaft B revolving in the same direction but with a lesser angular velocity, the weights $D'$, $D^2$ and $D^3$ are caused to oscillate back and forth on their respective supporting shafts $d'$, $d^2$, and $d^3$ respectively. Figs. 3 to 7, inclusive, illustrate relative positions successively occupied by the weight $D'$ and the parts directly associated therewith as the weight supporting shaft $d'$ revolves relative to the driven shaft B in the clockwise direction about the common axis of the driving shaft A and driven shaft B, and the manner in which the weight $D'$ acts on the driving shaft A tending to retard the latter and acts on the driven shaft B tending to advance the latter is illustrated in those figures.

In the position of the parts shown in Fig. 3, the center of gravity of the weight $D'$, which is located at some point along the line $dc$, is angularly in advance of the plane indicated by the line Z which is radial to the driven shafts A and B, and includes the axis of the weight supporting shaft $d'$. In consequence, the weight $D'$ tends to swing in the counter-clockwise direction about its supporting shaft $d'$ under the action of centrifugal force. The tendency of the weight $D'$ to thus swing outward under the action of centrifugal force is resisted by the connections comprising the connecting rod $F'$ and crank shaft E between the weight $D'$ and shaft $H'$, and by the links $I'$ and the connecting rod $F'$ which fix the position of the shaft $H'$ relative to the shaft $d'$ and the crank pin portion $B'$ of the shaft B respectively. As is plainly apparent, the connecting rod $G'$ is under tension in the condition of the apparatus shown in Fig. 3, and consequently subjects the shaft B to a torque tending to rotate the latter in a clockwise direction. For any given speed of the driving shaft, the tension force transmitted by the connecting rod $G'$ when the parts are in the positions shown in Fig. 3 will increase as the speed of the driven shaft decreases. Consequently, in normal operation the driven shaft will be rotated at the particular absolute speed at which the forces transmitted to the shaft through the connecting rods $G'$, $G^2$ and $G^3$ will subject the shaft B to an average resultant torque equal, and opposite in direction to the retarding torque exerted on the shaft by the load on that shaft.

Figure 4:
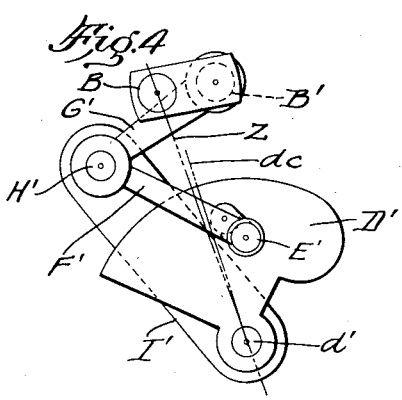
Figs. 4 to 7 show different positions successively occupied by the parts shown in Fig. 3.
Figure 5:
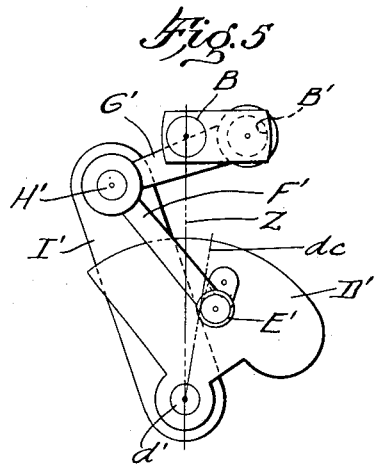

As the rotation of the shaft $d'$ about the axis of the shaft B continues, the shaft $H'$ and parts sharing its turning movement about the shaft $d'$, are moved inward and come closer to the shaft B, and the parts eventually assume the relative positions shown in Fig. 4. With the parts in the positions shown in Fig. 4, the line $dc$ passing through the axis of the shaft $d'$ and the center of gravity of the weight $D'$, lies at the rear of the line Z. In consequence, the centrifugal force action on the weight $D'$ then tends to, and does, rotate the latter in the clockwise direction about the shaft $d'$.

Rotation of the weight $D'$ in the clockwise direction relative to the distance pieces $I'$ about the shaft $d'$ is permitted at this time because the crank shaft E is free to rotate. While the weight $D'$ is thus free to turn in the clockwise direction about the shaft $d'$ the weight $D'$ is in effect released or disconnected from the driven shaft B and exerts no direct action on the latter. The period during which the weight $D'$ is thus disconnected from the driven shaft continues until the crank shaft E is turned through approximately 180° and the parts after passing through the relative positions shown in Fig. 5, occupy the relative position shown in Fig. 6. In the latter position the weight $D'$ is again operatively connected to the driven shaft crank portion $B'$ as a result of the fact that the connecting rod $F'$ is then under tension.

Figure 6:
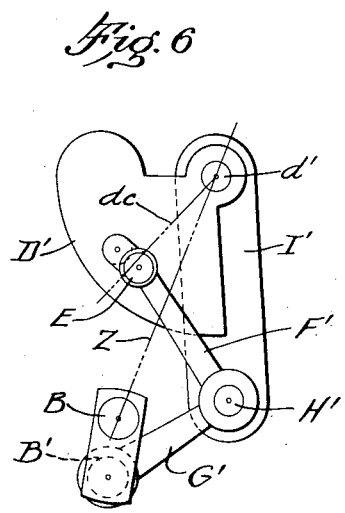

With the parts in the position shown in Fig. 6, the weight $D'$ still tends to turn in the clockwise direction about the shaft $d'$, and the connecting rod $F'$ is subjected to a tension force instead of being subjected to a compression force as it is in Fig. 3. In Fig. 6 also, the connecting rod $G'$ is subjected to a compression force instead of to a tension force as it is in Fig. 3. However, since in Fig. 6 the line of action of the connecting rod $G'$ on the crank pin portion $B'$ of the shaft B is at the opposite side of the axis of the shaft B from what it was in Fig. 3, the push on the crank pin portion $B'$ exerted by the connecting rod $G'$ with the parts in the relative positions shown in Fig. 6 will subject the driven shaft B to a torque still tending to rotate the driven shaft in the clockwise direction.

Figure 7:
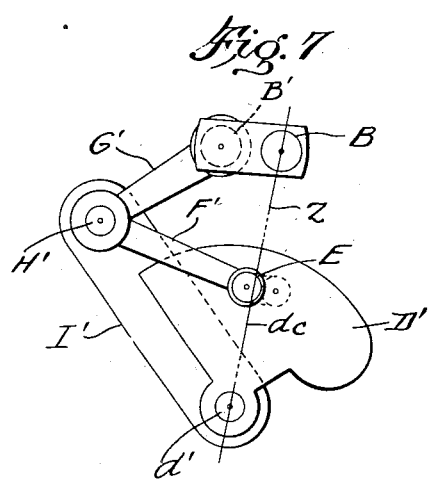

As the shaft $d'$ continues to rotate about the shaft B from the position shown in Fig. 6, the weight $D'$ is moved back toward its neutral position in which the line $dc$ coincides with the line Z as shown in Fig. 7, and as the motion is continued the line $dc$ is carried across the line Z, whereupon centrifugal force again tends to rotate the weight $D'$ about the shaft $d'$ in the counter-clockwise direction. As the weight $D'$ thus swings through its neutral position, it is in effect unlocked from the driven shaft and is free to, and does turn in the counter-clockwise direction about the shaft $d'$ until the crank shaft E is rotated relative to the weight $D'$ through an angle of approximately 180°, and the connecting rod $F'$ is again put under tension and prevents further movement of the weight $D'$ relative to the links $I'$, and the weight $D'$ then moves relative to the distance pieces $I'$ from the position shown in Fig. 7 into the position shown in Fig. 3, when the weight $D'$ again assumes the position relative to the distance pieces $I'$ shown in Fig. 3 and the weight $D'$ and pieces $I'$ are again locked together thus completing the operative cycle of the weight $D'$.

It will be observed that the axis of the pivotal connection between the connecting rod $F'$ and the crank $E'$ is normally not in, but on the outer side of the line connecting the axis of the pivotal connection between the crank shaft $E'$ and weight $D'$, to the axis of the shaft $H'$. This results from the action of centrifugal force on the connecting rod $F'$ and the crank portion of the crank shaft $E'$. The centrifugal force action on the last mentioned parts is useful in that it results in a torque creating effect during the brief intervals in which the weight $D'$ is not positively connected to the crank portion $B'$ of the crank B, which tends to increased uniformity in power transmission.

To avoid any tendency of the weight D' to stop in its neutral position, the parts are advantageously proportioned as indicated so that the weight D' is positively moved through and beyond its neutral position before the weight is released. The time required for the weight D' to swing outward under the action of centrifugal force from its neutral position when released from the driven shaft, into the position in which the weight is again operatively connected to the driven shaft, depends on the actual speed of rotation of the driving element. Under some conditions, and with some designs, the weight D' may be reconnected to the driven shaft before the connection of the corresponding connecting rod G' to the crank portion of the driven shaft has passed through the dead center position of said connection. In such case, the weight for a brief instant, may exert a torque on the driven shaft opposing the movement of the latter. This results in reducing the aggregate power transmitted at any particular speed, but does not involve any loss in energy or in efficiency, and with properly designed apparatus the reduction in power transmitted, or capacity, is so small as to be practically insignificant.

It will be understood without further explanation, that the cycle of movements and actions described with reference to the weight D' and associated parts occur also in the case of the weights $D^2$ and $D^3$ and their associated parts. The individual steps in the cycle of action of each of the three weights may be accurately described as being out of phase with the corresponding steps in the cycles for the other two weights, by an angle of 120° in the case of one of the other weights, and by an angle of 240° in the case of the third weight.

It will be apparent to those skilled in the art that the forces and movements given to the various relatively movable parts of the transmission described are more or less complex, and there seems to be no necessity for an exhaustive analysis herein of those forces and movements. It is important to note, however, that each weight D', $D^2$ and $D^3$ acts continuously throughout the major portion of the time in which the transmission is in operation, to impress upon the driven shaft a torque tending to rotate the latter in the same direction as the driving shaft rotates. With a given rotative speed of the driving shaft, the torque thus imparted to the driven shaft increases as the speed of the driven shaft decreases, since the decrease in speed of the driven shaft increases the frequency of oscillation of the weights D', $D^2$ and $D^3$, and thereby shortens the period during which each of the weights D', $D^2$ and $D^3$ is moved from either limit of its oscillatory movement to its neutral position by the force transmitted to the weight through its connection to the driven shaft. The fact that the torque imparted to the driven shaft by the transmission increases as the retarding torque on the driven shaft builds up, is a desirable characteristic of the invention and is necessary in order that a driving shaft rotating at an approximately constant speed and delivering power at a more or less constant rate may impart the power transmitted to a driven shaft subjected to a variable load retardation.

The aggregate energy transmitted to the driven shaft by the connections between the crank portion B' of the latter and the weight supporting shafts $d'$, $d^2$, and $d^3$, is furnished by the driving shaft, and results in corresponding reactive forces impressed upon the driving shaft through the weight supporting shafts $d'$, $d^2$, and $d^3$. Those forces oppose the movement of the driving shaft and constitute the direct load impressed on that shaft by the driven shaft. It is of interest also to note that when each weight, after moving through its neutral position and the normally operative connection between the weight and the driven shaft, is momentarily released, permitting the weight to move outward under the action of centrifugal force, the vis viva or kinetic energy of the weight is then increased owing to the increase in the average velocity of different portions of the weight. This temporary increase in kinetic energy stored in each weight must obviously be supplied by the driving shaft, and this energy is given back partly to the driving shaft and partly to the driven shaft as the weight is moved back to its neutral position. To prevent fluctuations in the driving shaft speed from this and other causes, the driving shaft should have suitable flywheel provisions. The desired flywheel effect may be advantageously secured in whole or in large part, by making the transmission housing member C of suitably massive construction.

When the aggregate torque which the weights D', $D^2$ and $D^3$ can impress upon the driven shaft is equal to or exceeds that required to rotate the driven shaft at the speed of the driving shaft, relative movement of the parts of the transmission cease and the driving and driven shafts rotate in unison.

Except as the provisions made for positively carrying the oscillating weights not only into but through and somewhat beyond their neutral positions may interfere, the described mechanism is reversible in the sense that either of the shafts A and B may be the driving shaft and the other the driven shaft, and in that the apparatus is operative without change with the two shafts both rotating in the clockwise direction or in the counter-clockwise direction.

In the modification illustrated in Fig. 8, the shaft B, the member C, and the parts enclosed within the latter, may be the same as in the construction shown in Figs. 1 and 2, except that the shaft extension $B^2$ in Fig. 8 is prolonged and carries a hub member K, on which are journalled bevel gears K' in mesh with bevel gear teeth carried by gear members L and M mounted on the shaft extension B² and free to turn on the latter. The gears L and M have spur gear teeth at the peripheries of compound gears L' and M', respectively. The gear L is larger in diameter than the gear M. The gears L' and M' may be counter-parts of the gears M and L, respectively, and are loosely mounted on a shaft $b$, having secured to it a hub or spider member KA on which are mounted bevelled gears K' which mesh with bevelled gear teeth carried by the compound gears L' and M'. The member C has its trunnion-like portion C' rigidly secured to the gear M.

With the arrangement shown in Fig. 8, the gearing connecting the shafts B and $b$ forms an epicyclic gear train, and if power is supplied to the shaft B tending to rotate the latter in the counter-clockwise direction, for example, the shaft $b$ will tend to rotate in the same direction at a velocity which depends jointly on the retarding torque of any load impressed upon the shaft $b$, and on the torque impressed by the driving shaft through the oscillating weights and connections on the member C, which in this case normally revolves at a velocity greater than that of either of the shafts B and $b$.

With a given rotative speed of the shaft B, an increase in the retarding load carried by the shaft $b$ tends to slow down the latter. As a result of the epicyclic gear train connection between the shaft $b$ and the member C, any decrease in speed of the shaft $b$ without a corresponding decrease in the speed of the shaft B results in an increase in the speed of the member C. An increase in the speed of the member C increases the aggregate force required to give the necessary oscillatory movements to the oscillating weights carried by the member C and thereby increases the force with which the member C tends to retard the rotation of the gear M. It follows that the effect of an increase in the retarding load carried by the shaft $b$ without a corresponding reduction in the speed of the shaft B decreases the speed of the shaft $b$ only to the value at which the retarding force imparted to the gear M by the member C is equal to the turning force imparted to the gear M' by the shaft $b$. Disregarding friction and the conversion factors dependent on the ratios of the meshing gears, the torque impressed on the gear M' by the shaft $b$ is equal to the excess of the load retarding torque acting on the shaft $b$ and the driving torque impressed on the latter through the gears L and L'.

In the modification illustrated in Fig. 9, the parts B, B', G', H', I', and $d'$ may be identical with the correspondingly designated parts of the construction shown in Figs. 1 and 2. The weight $D^8$ of Fig. 9 need differ from the weight D' of Figs. 1 and 2 only in the omission of the crank E and the provision in lieu thereof of lugs or projections $D^{10}$ and $D^{11}$ on the weight DA which limit the angular movement of the weight DA' relative to the link or distance piece I'.

The operation of the apparatus shown in Fig. 9 is essentially the same as that of the apparatus shown in Figs. 1 and 2. With the weight DA' at the limit of its movement in the counter-clockwise direction about the shaft $d'$ the lug $D^{11}$ engages the adjacent edge of the link I' and as the shaft $d'$ revolves about the axis of the shaft B and the shaft H' is moved toward the axis of the shaft B the link I' acting through the lug $D^{11}$ turns the weight DA' toward its neutral position. As soon as the weight moves through its neutral position the operative connection between it and the link I' is temporarily released and is restored only when the weight swinging in the clockwise direction under the action of centrifugal force comes into the position in which the lug $D^{10}$ engages the adjacent edge of the link I'. It will thus be seen that the lugs $D^{10}$ and $D^{11}$ in conjunction with the link I' provide a releasable and adjustable connection between the weight DA' and the shaft H' and thereby with the crank B' which in a general way is equivalent to that form in the construction shown in Figs. 1 and 2 by the connecting rod F' and crank shaft E'.

In Figs. 10 and 11, I have illustrated an embodiment of my invention which, while similar in general principle to the constructions previously described, is of quite different form from the latter. In the arrangement shown in Figs. 10 and 11, a chambered member CA, which constitutes or forms a part of one element of the transmission, is mounted on, and is free to turn about the shaft BB which forms the other element of the transmission. The member CA, which preferably is relatively massive to give a desirable fly-wheel effect, is formed with radial guideways $C^{10}$ for one or more radial movable weights. As shown, there are two of these weights DB and DB' located on opposite sides of the shaft BB. One of the weights, DB, is connected, as by a pivot pin O, to the outer end of a connecting rod P, while the other weight DB is similarly connected to the outer end of a connecting rod P'. The connecting rod P has an eccentric strap at its inner end surrounding an eccentric Q, while the connecting rod P' has its inner end bifurcated and each fork provided with an eccentric strap surrounding a corresponding eccentric Q'. As shown, the eccentrics Q and Q' form part of an integral eccentric body journaled on the shaft A. Grooves $Q^2$ formed in the eccentric body and balls located in those grooves provide a pawl and ratchet connection between the eccentric body and the shaft BB which permits the eccentric body to rotate freely on the shaft BB in the counter-clockwise direction as seen in Fig. 11, but prevents rotation of the eccentric body relative to the shaft BB in the clockwise direction.

With the apparatus shown in Figs. 10 and 11, if the element CA is positively rotated in the clockwise direction as seen in Fig. 11, and a retarding load on the shaft BB prevents the latter from rotating with an equal velocity, the rotation of the member CA relative to the shaft BB results in radial to and fro movements of the weights DB and DB' in their guideways $C^{10}$. The inward movements of the weights is effected by the connecting rods P and P', and through the latter and their eccentric crank connections to the shaft BB subject the latter to a torque which is a function of the absolute speed of the member CA and of the relative speeds of the member CA and shaft BB. When the weights DB and DB' are being drawn inward, the eccentric body is held by the pawl and ratchet mechanism against rotation on the shaft BB. When the weights DB and DB' reach their inner, or neutral positions, the line of action of each connecting rod shifts from one side to the other of the plane including the axis of the shaft BB and the axis of the corresponding eccentric, and the latter then turns in the clockwise direction through an angle of approximately 180° relative to the shaft BB, while the weights DB and DB' are moving to their outer positions. In their outer movements the weights are in effect disconnected from the shaft BB.

The mode of operation of the apparatus shown in Figs. 10 and 11 is illustrated diagrammatically in Figs. 12–15 wherein different relative positions of the weight DB and associated parts, are shown. It will be apparent that movements of, and effects produced by the weight DB', are duplicates of the movements and effects of the weight DB.

In Figs. 12 to 15, I have assumed conditions of operation such that the element CA rotates at twice the angular velocity of the shaft BB. In Fig. 15 the parts are shown in a position in which the connecting rod P is radial to the shaft BB and the axis of the pivotal connection between the connecting rod P and the eccentric Q is between, and in the same plane with the axis of the shaft BB and the center of the weight DB. Fig. 12 shows the relative position of the parts after a movement of the shaft BB through an angle of 45° or so, from the position shown in Fig. 15. Since the element CA rotates at twice the speed of the shaft BB, in Fig. 12 the weight DB will be angularly advanced about the shaft BB with respect to the axis of the eccentric Q through an angle equal to the angular difference between the positions of said axis in Fig. 15 and Fig. 12.

As will be apparent from Fig. 12, as the parts move away from the positions shown in Fig. 15, the weight DB exerts a centrifugal force action on the eccentric Q tending to rotate the latter in the clockwise direction and to similarly rotate the shaft BB since relative rotation between the shaft BB and eccentric Q is then prevented by the action of the pawl and ratchet connection.

Inasmuch as the angular velocity of the member CA and the weight DB is by assumption greater than that of the shaft BB, the weight DB is moved radially inward towards the shaft BB as the parts move out of the position shown in Fig. 15. As a result of the decreasing radius of the path of movement of the weight DB at this time, the lineal velocity, and thereby the kinetic energy of the weight DB, diminishes as the weight approaches the shaft BB. The energy then taken out of the weight DB is utilized in part in rotating the shaft BB and in part is utilized in speeding up the member CA, the weight DB exerting a tangential reactive force against the corresponding guideway $C^{10}$ in a direction tending to increase the angular velocity of the member CA. The actual value of the forces exerted on the element CA and shaft BB by the weight DB depends, of course, upon the mass of the latter, and on the throw of the eccentric Q, and on the length of the connecting rod P, and varies with the square of the angular velocity of the element CA, and varies with changes in the angle which the axis of the rod P makes with the radial plane including the axis of the shaft BB and the axis of the eccentric Q. The turning effect or torque on the shaft BB exerted by the centrifugal weight DB continues until the parts reach the position shown in Fig. 13 in which the axis of the shaft BB is between and in the same plane with the axis of the eccentric Q and the center of the weight DB.

As the parts move out of the position shown in Fig. 13, centrifugal force causes the weight DB to move tangentially with respect to the shaft BB until the parts return to the position shown in Fig. 15, since the centrifugal pull action on the eccentric Q moves the latter in the counter-clockwise direction permitted by the ratchet clutch mechanism, to accommodate the tangential movement of the weight DB. Fig. 14 represents an intermediate position of the parts as they pass from the positions shown in Fig. 13 into that shown in Fig. 15. During the movement of the parts from the position shown in Fig. 13 through the position shown in Fig. 14 back into the position shown in Fig. 15, there is no significant interaction between the shaft BB and the weights DB and DB'. While the weights are thus locked from the shaft BB and are moving radially outward under the action of centrifugal force, the linear velocity of the weights is being increased. In consequence, during this outward movement of the weights the latter absorb energy from and in consequence tend to retard the rotation of the member CA. The periods during which the weights are unclutched from the shaft BB are relatively brief, and the total cessation of any driving torque on the shaft BB during those periods, as well as the variations in the driving torque resulting from the changes in the angle between the connecting rods and the plane including the eccentric axes, may be smoothed out and compensated for by the action of a suitable fly wheel which may be formed in whole or in part by the housing CA. The tendency of the weights to speed up the rotation of the member CA during the periods in which the weights are being moved radially inward towards the shaft BB subjects the latter to an aggregate torque in the clockwise direction which is less than the aggregate retarding torque effect on the member CA of the weights when the latter are moving outward. A smoothing out effect can also be obtained, of course, by the use of a plurality of weights having their radial movements regularly displaced in phase.

It will be apparent from what has been said that, disregarding ordinary friction losses, the member CA may rotate at an approximately constant speed and deliver power at an approximately constant rate to the driven shaft BB notwithstanding wide variations in the retarding torque of the load carried by the latter. Since the energy delivered by the shaft BB cannot exceed that received from the member CA, any increase or decrease in the retarding torque on the shaft BB necessarily results in a decrease or increase in the speed of the shaft BB.

This automatic variation in the speed ratio between the driving and driven shafts in response to changes in the load carried by the driving shaft obtainable with each of the forms of the invention illustrated is highly advantageous for many purposes. For instance, in the case of an automobile driven by an ordinary internal combustion engine, the fuel throttle valve for the latter may be set into the position to give a desirable average speed of travel along a level road with a desirably low fuel consumption for the power which the engine is then required to develop. When the automobile starts up an incline the automobile tends to slow down, of course, but the slowing down of the automobile does not result in anything like as large a change in the engine crank shaft speed and lowered engine efficiency and power as would be the case with an ordinary transmission. In the case of some electric drives in which variable loads are carried by shunt wound motors or by induction motors which operate more efficiently and to better advantage at approximately constant speeds, a transmission constructed in accordance with the present invention can be advantageously employed to vary the speed of the driven shaft inversely with the load and thereby maintain the driving motor in operation under full load at its most desirable speed. Similarly, other motors, such as steam turbines, may be operated with advantage by aid of the present invention to carry a variable load while developing constant power and operating at constant speed.

With a driving motor like an internal combustion engine or various forms of electric motors in which the speed of the motor varies inversely with the retarding load torque, it is possible to increase the maximum variation in the load retarding torque which can be taken care of with a given variation in the speed of the motor by connecting the motor shaft to the driven shaft through a plurality of my improved transmissions having suitably different characteristics. For example, as shown in Fig. 16, the driving shaft A and driven shaft BC may be coupled by two transmissions CX and CY each of the form shown in Figs. 1 to 7, inclusive, but with the weights, $D'$, $D^2$ and $D^3$, of the transmission CX smaller than the corresponding weights of the transmission CY. With the construction shown in Fig. 16, when the retarding torque of the load on the shaft BC is below a certain critical value, the weights of neither transmission will oscillate, and the shafts A, B, and BC will all turn at the same speed which will diminish more or less depending on the characteristic of the driving motor as the retarding load torque increases. When the retarding torque of the load on the shaft BC increases above said critical value, the angular velocity of the shaft B will decrease relative to the velocity of the shaft A, and the weights $D'$, $D^2$ and $D^3$ of the transmission CX will then begin to oscillate about their pivotal connections to the housing of the transmission CX. As the speed of the shaft B thus decreases relative to that of the shaft A, the retarding torque of the load on the shaft A diminishes, and the latter begins to speed up thereby regaining more or less of the velocity which it had previously lost. As the retarding torque of the load on the shaft BC further increases to a second critical value, the weights of the transmission CY will begin to oscillate about their pivotal connection to the housing member of the housing CY, the velocity of the shaft BC then decreasing relative to that of the shaft B. Advantageously, this second critical retarding torque value will be reached before the speed of the driving motor shaft A reaches an undesirably high or racing value.

As the retarding torque on the shaft BC is further increased after the shaft BC begins to turn more slowly than the shaft B, the absolute speed of the shaft B will increase and eventually, as said retarding torque continues to increase, the speed of the shaft B will again become equal to that of the shaft A, the weights of the transmission CX then ceasing to oscillate about their pivotal connections to the housing of the transmission CX. During the period in which the shaft BC is turning more slowly than the shaft B and the shaft B is turning more slowly than the shaft A but is increasing in speed relative to the shaft A, the speed of the latter will diminish. After the increasing load retarding torque has resulted in bringing the speed of the shaft B up to the speed of the shaft A, the speed of the latter will again begin to increase. In practice, with two transmissions between the driving and driven shafts as shown in Fig. 16, the apparatus should be so designed that the load retarding torque on the shaft BC will be attained before the speed of the shaft A reaches a dangerous or racing limit. Certain novel features disclosed and included within the generic claims herein made are also disclosed and made the subject matter of more specific claims in my copending application Serial No. 102,845, filed April 19, 1926.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

I claim:

1. In a power transmission, the combination of revoluble members, one or more centrifugal weights each mounted on one of said members so as to move toward and away from the axis of rotation of the latter, and a connection between each such weight and the second member including a crank carried by the latter which on a certain relative angular movement of said members causes said weight to move inward toward the axis of rotation of the member on which the weight is mounted, said connection including provisions for automatically adjusting its effective length at the end of each inward movement of said weight to thereby permit a quick outward movement of the latter.

2. In a power transmission, the combination with revoluble members of one or more centrifugal weights each mounted on one of said members so as to move toward and away from the axis of rotation of the latter along a predetermined path, and a connection through which said second member moves said weight to the inner end of said path, said connection including a crank and adjusting provisions operating automatically to permit said weight to move quickly outward when said crank is in or near a position at the opposite side of said axis from said weight.

3. In combination, a revoluble member, a shaft carrying a crank and revoluble about the same axis as said member, a weight pivotally connected to said member to turn relatively thereto about an axis displaced from the center of gravity of said weight, and means connected to said crank through which the latter acts on the weight to move said center inward from each outward limit of an arc shaped path of movement crossing the plane including said axes, when said member and shaft have different angular velocities said means being automatically adjustable to permit the weight after crossing said plane to swing quickly outward to the corresponding limit of its movement.

4. In combination a revoluble member, a shaft carrying a crank and revoluble about the same axis as said member, a weight pivotally connected to said member to turn relatively thereto about an axis displaced from the center of gravity of said weight and means connected to said crank through which the latter acts on the weight to move said center inward from each outward limit of an arc-shaped path of movement crossing the planes including said axis when said member and shaft have different angular velocities, said means comprising a linkage including a connecting rod and a distance piece, the latter being pivotally connected at one end to said member coaxially with its weight and pivotally connected at its other end to one end of said rod and the second end of said rod being pivotally connected to said crank, and a connection between said weight and said linkage including a crank shaft adapted to rotate and change the effective length of said connection, when the center of gravity of said weight is moved across said plane and the direction in which said weight tends to turn under the action of centrifugal force is reversed.

5. In combination a revoluble member, a shaft carrying a crank and revoluble about the same axis as said member, a weight pivotally connected to said member to turn relatively thereto about an axis displaced from the center of gravity of said weight and means connected to said crank through which the latter acts on the weight to move said center inward from each outward limit of an arc-shaped path of movement crossing the planes including said axis when said member and shaft have different angular velocities, said means comprising a linkage including a connecting rod and a distance piece, the latter being pivotally connected at one end to said member and pivotally connected at its other end to one end of said rod and the second end of said rod being pivotally connected to said crank, and a connection between said weight and said linkage including a crank shaft adapted to rotate and change the effective length of said connection, when the center of gravity of said weight is moved across said plane and the direction in which said weight tends to turn under the action of centrifugal force is reversed.

Signed at New York city, in the county of New York and State of New York, this 23d day of December, A. D. 1926.

CHARLES R. NICHOLS.